Patented Mar. 3, 1953

2,630,387

UNITED STATES PATENT OFFICE 2,630,387

TREATMENT OF LIQUID EGG ALBUMIN

Albert K. Epstein and Bernard M. Shaffer, Chicago, Ill., assignors to The Emulsol Corporation, Chicago, Ill., a corporation of Illinois No Drawing. Application October 13, 1947, Serial No. 779,646

12 Claims. (Cl. 99—113)

Our invention relates to the treatment of liquid egg whites and is concerned in part with the preparation of dried egg whites having superior qualities and characteristics.

The processing of liquid egg whites in order to produce dried products having satisfactory characteristics with respect to color, odor, keeping properties, whipping characteristics, sugar retention, freedom from insoluble matter, and the like involves complex physico-chemical phenomena, accentuated by the fact that natural egg whites contain a multiplicity of different protein materials having varying physical and chemical properties. Numerous processes have been evolved having as their objectives to produce superior dried egg whites. While such processes have brought about certain improvements, much was left to be desired.

It is well recognized that the drying of liquid egg whites in their natural condition produces a product which is objectionable from a number of standpoints including its reconstitution and whipping properties which suffer materially. Hence, it has been standard practice to subject liquid egg whites, prior to the drying step, to extended fermentation, ripening, or enzyme treatment. While such procedures result in products having certain definite advantages with regard to whipping properties and the like, they concomitantly introduce serious objections with respect to odor of the final product as well as in regard to other aspects. Prior fermentation processes are discussed, for example, in U. S. Patents Nos. 1,818,212; 1,818,214; 1,996,801; 2,056,082; 2,059,399; and 2,166,070, as well as in a number of other patents.

In an effort to obviate the disadvantages of fermentation or ripening procedures it has been proposed to eliminate the same and resort, instead, to the treatment of the natural liquid egg whites with various nontoxic acids such as lactic acid, hydrochloric acid, and the like, under controlled conditions of pH, prior to the drying operation. Typical of such acid treatment processes are those disclosed in U. S. Patents Nos. 2,059,399; 2,168,926 and 2,189,380. In U. S. Patent No. 2,280,147, a combination acid addition-fermentation treatment is utilized, the acid first being added to the liquid egg whites and then the acidified liquid egg whites are subjected to fermentation, by the organisms present in the egg whites, the acid condition being utilized as a control of the fermentation.

Our invention involves the subjection of liquid egg whites to a series of steps, under certain controlled conditions, as a result of which the final products have exceptionally satisfactory properties, notably in relation to freedom from insolubles, practical sterility, odor, whip, and sugar carrying capacity, and freedom from discoloration on aging. In general, our invention comprises initially subjecting liquid egg whites, which in the fresh condition have a pH of about 8.5, to extended fermentation to effect ripening thereof. The fermentation is allowed to proceed, in general, until a pH of 6 is reached but it may be allowed to continue to as low as pH 5.5 or even pH 5.3. The denatured scum which forms is removed, the fermented liquid egg whites which undergo chemical and biological change due to the action of the micro-organisms, under initially alkaline and then progressively under neutral and finally acidic conditions, are then admixed with a non-toxic acid-reacting material to produce a pH in the range of about 4.8 to approximately 5.1 and the mixture is then preferably allowed to stand for a number of hours, whereupon a precipitate of previously dispersed fermented albumins forms and settles out. The supernatant liquid is then preferably centrifuged or filtered to clarify it and it may then be dried in any of the usual ways as, for example, by spray drying, pan drying, or the like, or it may be used as such or frozen. Without the addition of culture, the fermentation and ripening to the aforesaid pH of 4.8 to approximately 5.1 may take as long as 96 hours or even longer at 70 degrees F. With the addition of strong cultures of desirable micro-organisms, the fermentation and ripening time may be reduced to 48 hours or even less. The lower the temperature at which fermentation and ripening are conducted, other conditions remaining equal, the longer will be the time of fermentation and ripening.

It should be noted that the final albumen product obtained pursuant to the present invention does not contain the denatured protein material which becomes insoluble as a result of the biochemical changes which occur during the alkaline, neutral and acid stages of the fermentation process and are subsequently removed. It also does not contain that portion of the protein material which has undergone fermentation and remained in solution but which subsequently becomes denatured upon the addition of the acid. Products produced in accordance with our invention, when reconstituted, may be substantially free of suspended material, have good whipping properties, do not have to be aged before they attain their desired whipping properties, and have high sugar-carrying capacity when whipped with sugar. They possess the additional advantage that, when dissolved in water and allowed to stand several hours or overnight, they do not develop putrid odors.

As an illustrative example of our present invention, approximately 3,000 pounds of liquid egg whites were placed in a jacketed kettle and brought to a temperature, with stirring, of about 70 degrees F. A good, heavy culture of organisms present in natural egg whites was added and the liquid egg whites were then allowed to ferment without stirring at a temperature of about 70 degrees F. until the product had a pH of approximately 5.9. The time of fermentation was approximately 55 hours. When the fermentation was completed, the mass of ripened liquid egg whites was separated from the denatured scum which formed during the fermentation and the separated liquid egg whites were transferred to another kettle. Thereupon, 3% of a 10% lactic acid solution was added, with stirring, until a pH of 4.8 to 4.85 was reached and allowed to stand for 10 hours. A slight precipitate formed which settled out. The supernatant liquid was then centrifuged to clarify it and was then placed in pans to dry. The final dried product was free of insoluble matter, was practically sterile, had good odor and whipping properties, was characterized by exceptionally good sugar carrying capacity, and retained its good properties and appearance on aging.

In another illustrative example of our present invention, to 20,000 pounds of fresh liquid egg whites, at a pH of 8.8, a culture of organisms contained in natural egg whites was added and the mixture was allowed to stand for 48 hours at 65 degrees F. at which time a pH of 5.6 was reached. The portion of the protein which became coagulated during the subjection of the egg whites to said extensive ripening during the alkaline and acid stages until the pH of 5.6 was reached was removed. To the remaining fermented liquid egg whites, 560 pounds of a 10% lactic acid solution was added, with constant stirring, and the pH of the resulting liquid was 4.8. Stirring was discontinued and the mixture was allowed to stand overnight. The precipitate which formed was separated from the liquid by centrifugal action. The pH of the liquid was 4.9, this change occurring possibly because of elimination of carbon dioxide or perhaps was due to certain biochemical changes. The liquid was then dried in pans by passing air thereover at a temperature of 119 degrees F. or slightly higher but below the coagulation temperature.

The time and temperature of fermentation and ripening depend upon the nature of the original egg whites used, the degree of resistance to biochemical changes due to the presence of antibiotic substances, types of organisms and enzymes present, and quantity of culture or the number of organisms present. The fermentation may be carried out in any of the ways heretofore known in the art and the liquid egg whites, which may be freshly broken or thawed-out frozen products, may be subjected to any of the conventional treatments prior to fermentation as, for example, by the addition of sugars, acids, and the like. If desired, previously cultured egg whites containing a heavy inoculate of acid-producing organisms or other acid-producing cultures, for example, lactic-acid producing cultures, may be added to the liquid egg whites in order to facilitate the fermentation. In general, the time of fermentation may be varied from about 45 hours to about 100 hours depending upon the amount of organisms and enzymes present in the medium. We claim no novelty in the fermentation step per se and, as indicated above, the fermentation step may be carried out in several ways heretofore known in the prior art as disclosed, for example, in U. S. Patents Nos. 1,818,212; 1,818,214; 2,168,926 and 2,280,147.

In an alternative procedure, pursuant to our present invention, liquid fresh egg whites may initially be acidified with lactic acid or other edible acid to a pH of about 7 and then fermented and ripened to a pH of about 5.9 to 5.3. During this period, the natural egg white proteins undergo biological changes due to the ripening process during the neutral and acid stages only. As a result of such changes in the neutral and acid stages only, a portion of the soluble proteins becomes precipitated and these are removed from the liquid. The liquid, which contains the soluble egg white proteins, is then acidified with an edible acid such as, for example, lactic acid, to produce a pH of 4.8 to 5.1, preferably 4.8 to 4.9, and stirred. An additional precipitation takes place of protein which was ripened and had undergone biochemical change but previously remained in solution. Said precipitate is removed and the remaining liquid dried.

While, in the illustrative examples set forth above, we have shown the use of lactic acid, it will be understood that other non-toxic acids or acid reacting materials of organic or inorganic character may be utilized in place of lactic acid, typical examples of such being tartaric acid, sodium acid tartrate, citric acid, acetic acid, malic acid, gluconic acid, gluconolactone, sulfurous acid, sulfuric acid, hydrochloric acid, phosphoric acids, mono-sodium dihydrogen phosphate, and the like. The acid addition should be controlled so that the pH of the mixture after the acid addition is approximately 5 and, preferably, is in the range of about 4.8 to about 5.1. The addition of the acid, in this stage of the process of our invention, tends to reduce the insolubles in the final dried product and it would appear that this is accomplished through an inhibitory effect upon coagulation of egg proteins during the drying operation. The acid addition to the biologically reacted egg albumins also seems to bring about better protein dispersion and, thus, to enhance the whipping properties and to impart the unusually good sugar-carrying capacity which characterizes the products produced in accordance with our invention. During the fermentation and ripening process in alkaline, neutral and acid media, but before the egg whites reach a pH of about 4.9 or 5, there is an enormous multiplication of organisms. When the thus ripened egg whites are subsequently treated with acid, such as lactic acid, for example, pursuant to our process as described hereinabove, there is a considerable reduction of the micro-organisms in the finished product.

After the addition of the acid-reacting material, a slight precipitate is usually formed after a number of hours. If desired, the acidified liquid mass may be allowed to stand at about 75 degrees F. to about 80 degrees F. to permit settling. After the precipitate has settled out, the supernatant liquid may then be removed and dried in any suitable manner. In many instances, the supernatant liquid is quite clear but, in any event, we prefer to subject the liquid to centrifugal clarification or filtration in order to remove the insoluble material.

While the invention is particularly advantageous in connection with the preparation of dried egg whites, it should be understood that, in its broader phases, the treated liquid egg whites need not be subjected to the final step of drying since they may, for example, be handled and used as such or subjected to freezing, partial concentration, incorporation with other ingredients, or similar operations.

While the invention has been described in detail, it will be understood that the scope thereof is not to be limited other than as is set forth in the claims.

What we claim as new and desire to protect by Letters Patent of the United States is:

1. In a method of treating liquid egg whites, the steps which comprise subjecting liquid egg whites to extended fermentation to effect ripening thereof progressively through alkaline, neutral and acid stages, separating the ripened liquid egg whites from the scum which is formed during the fermentation, and admixing said ripened liquid egg whites with an amount of a non-toxic acid-reacting material until the mixture has a pH of about 4.8 to about 5.1.

2. In a method of treating liquid egg whites, the steps which comprise subjecting liquid egg whites to extended fermentation to effect ripening thereof progressively through the alkaline, neutral and acid stages, separating the ripened liquid egg whites from the scum which is formed during the fermentation, admixing said ripened liquid egg whites with an amount of a non-toxic acid-reacting material until the mixture has a pH of about 4.8 to about 5.1, separating the liquid from the precipitate which is formed, and then drying the liquid at a temperature below that at which the albumen coagulates.

3. In a method of treating liquid egg whites, the steps which comprise subjecting liquid egg whites to extended fermentation to effect ripening thereof progressively through the alkaline, neutral and acid stages, separating the ripened liquid egg whites from the scum which is formed during the fermentation, admixing said ripened liquid egg whites with an amount of a non-toxic acid-reacting material until the mixture has a pH of about 4.8 to about 5.1, maintaining the mixture at a temperature of about 75 to about 80 degrees F. for at least several hours, and separating the liquid from the precipitate which is formed.

4. In a method of treating liquid egg whites, the steps which comprise subjecting liquid egg whites to extended fermentation, in the presence of an added lactic acid producing culture, to effect ripening of said egg whites progressively through the alkaline, neutral and acid stages, separating the ripened liquid egg whites from the scum which is formed during the fermentation, and admixing said ripened liquid egg whites with an amount of a non-toxic acid until the mixture has a pH of about 4.8 to about 5.1.

5. In a method of treating liquid egg whites, the steps which comprise subjecting liquid egg whites to extended fermentation in the presence of an added lactic acid producing culture to effect ripening of said egg whites progressively through the alkaline, neutral and acid stages until a pH of 6 to 5.6 is reached, separating the ripened liquid egg whites from the scum which is formed during the fermentation, admixing said ripened liquid egg whites with an amount of a non-toxic acid-reacting material until the mixture has a pH of about 4.8 to about 5.1, separating the liquid from the precipitate which is formed, and drying the liquid at a temperature below that at which the albumen coagulates.

6. In a method of treating liquid egg whites, the steps which comprise subjecting liquid egg whites to extended fermentation in the presence of an added lactic acid producing culture to effect ripening of said egg whites progressively through the alkaline, neutral and acid stages until a pH of 6 to 5.3 is reached, separating the ripened liquid egg whites from the scum which is formed during the fermentation, admixing said ripened liquid egg whites with a non-toxic acid until the mixture has a pH of about 4.8 to about 5.1, separating the liquid from the precipitate which is formed, and then drying the liquid at a temperature below that at which the albumen coagulates.

7. In a method of treating liquid egg whites, the steps which comprise subjecting liquid egg whites to extended fermentation to effect ripening thereof progressively through alkaline, neutral and acid stages until a pH of 6 to 5.3 is reached, separating the ripened liquid egg whites from the scum and insolubles which are formed during the fermentation, admixing said ripened liquid egg whites with a non-toxic acid-reacting material until the mixture has a pH of about 4.8 to about 5.1, and drying said product below the temperature of coagulation of the albumen.

8. In a method of treating liquid egg whites, the steps which comprise subjecting liquid egg whites to extended fermentation to effect ripening thereof progressively through alkaline, neutral and acid stages until a pH of 6 to 5.3 is reached, separating the ripened liquid egg whites from the scum and insolubles which are formed during the fermentation, admixing said ripened liquid egg whites with a non-toxic acid-reacting material until the mixture has a pH of about 4.8 to about 4.9, separating the liquid from the precipitate which is formed, and drying the liquid below the temperature of coagulation of the albumen.

9. In a method of treating liquid egg whites, the steps which comprise adding a non-toxic acid-reacting material to liquid egg whites to produce a pH of about 7, subjecting said liquid egg whites to extended fermentation to effect ripening thereof until a pH in the range of 6 to 5.3 is reached, separating the ripened liquid egg whites from the insolubles which are formed during the fermentation, and admixing said ripened liquid egg whites with an amount of a non-toxic acid-reacting material until the mixture has a pH of about 4.8 to about 5.1.

10. In a method of treating liquid egg whites, the steps which comprise adding a non-toxic acid-reacting material to liquid egg whites to produce a pH of about 7, subjecting said liquid egg whites to extended fermentation in the presence of an added lactic acid producing culture to effect ripening thereof until a pH in the range of 6 to 5.6 is reached, separating the ripened liquid egg whites from the insolubles which are formed during the fermentation, admixing said ripened liquid egg whites with an amount of a non-toxic acid-reacting material until the mixture has a pH of about 4.8 to about 5.1, separating the liquid from the precipitate which is formed, and drying the liquid at a temperature below that at which the albumen coagulates.

11. In a method of treating liquid egg whites, the steps which comprise subjecting liquid egg whites, to which a non-toxic acid has been added to produce a pH not in excess of 7, to extended fermentation to effect ripening thereof until a pH in the range of 6 to 5.3 is reached, separating the ripened liquid egg whites from the insolubles which are formed during the fermentation, admixing said ripened liquid egg whites with an amount of a non-toxic acid until the mixture has a pH of about 4.8 to about 4.9, separating the liquid from the precipitate which is formed, and then drying said liquid at a temperature below that at which the albumen coagulates.

12. In a method of treating liquid egg whites, the steps which comprise subjecting liquid egg whites to extended fermentation to effect ripening thereof progressively through alkaline, neutral and acid stages, separating the ripened liquid egg whites from the scum which is formed during the fermentation, admixing said ripened liquid egg whites with an amount of a non-toxic acid-reacting material until the mixture has a pH above the iso-electric point of the biologically reacted and acidified egg proteins but not above 5.1, and separating the liquid from the precipitate which is formed.

ALBERT K. EPSTEIN.
BERNARD M. SHAFFER.

REFERENCES CITED

The following references are of record in the file of this patent:

UNITED STATES PATENTS

| Number | Name | Date |
|---|---|---|
| 1,996,801 | Fischer | Apr. 9, 1935 |
| 2,189,380 | Littlefield | Feb. 6, 1940 |
| 2,280,147 | Fischer | Apr. 21, 1942 |
| 2,427,726 | Hopkins et al. | Sept. 23, 1947 |

FOREIGN PATENTS

| Number | Country | Date |
|---|---|---|
| 314,887 | Great Britain | July 2, 1929 |